United States Patent [19]

Brackenridge

[11] 4,083,818
[45] Apr. 11, 1978

[54] FLAME RETARDANT POLYMERS

[75] Inventor: David R. Brackenridge, Royal Oak, Mich.

[73] Assignee: Ethyl Corporation, Richmond, Va.

[21] Appl. No.: 617,273

[22] Filed: Sep. 29, 1975

[51] Int. Cl.$^2$ .............................................. C08K 5/53
[52] U.S. Cl. .......................... 260/2.5 AJ; 260/40 R; 260/45.7 P; 260/865; 260/DIG. 24
[58] Field of Search .................... 260/2.5 AJ, 45.7 P, 260/961, 77.5 AR

[56] References Cited

U.S. PATENT DOCUMENTS

| | | | |
|---|---|---|---|
| 2,668,842 | 2/1954 | Tolkmith | 260/961 |
| 2,900,405 | 8/1959 | McCall et al. | 260/961 |
| 3,250,827 | 5/1966 | Schroll | 260/961 |
| 3,400,085 | 9/1968 | Kujawa et al. | 260/2.5 |
| 3,547,842 | 12/1970 | Bright et al. | 260/2.5 |
| 3,689,602 | 9/1972 | Ismail | 260/936 |
| 3,784,652 | 1/1974 | Gourse | 260/956 |
| 3,830,886 | 8/1974 | Davis et al. | 260/953 |
| 3,905,922 | 9/1975 | Smith et al. | 260/2.5 AJ |
| 3,929,688 | 12/1975 | Honig | 260/2.5 |
| 3,935,123 | 1/1976 | Prokai et al. | 252/351 |
| 3,968,060 | 7/1976 | Vincent et al. | 260/2.5 AJ |
| 3,991,010 | 11/1976 | Noetzel et al. | 260/45.7 P |

OTHER PUBLICATIONS

Neth. Appl. 6,405,455, Chem. Abs., vol. 62, 1965, citation 10632f.
Graf, Chem. Abs., vol. 46, 1952, citation 7516i.

*Primary Examiner*—Donald E. Czaja
*Assistant Examiner*—R. A. White
*Attorney, Agent, or Firm*—Donald L. Johnson; John F. Sieberth; Robert A. Linn

[57] ABSTRACT

Compounds such as methylbis(2,4,6-tribromophenyl)phosphonate and phenylbis(2,4,6-tribromophenyl)phosphonate are useful as flame retardants for organic polymers and resins such as polyurethane foams, polyesters, and polystyrene.

5 Claims, No Drawings

FLAME RETARDANT POLYMERS

BACKGROUND OF THE INVENTION

Various phosphonates are known in the art; confer G. M. Kosolapoff, *Organophosphorus Compounds*, J. Wiley and Sons, New York, N.Y. (1950).

So far as is known, the phosphonates of this invention or their fire retardant use has not been described in the art.

A polymeric phosphonate from 4, 4'-isopropylidene bis(2, 6-dibromophenol) and phenoxy dichlorophosphine oxide and its use in flame retarding polyesters is known; French Patent No. 2,081,083. Bis(tribromophenol) monoalkyl phosphoric acid esters and their use in polymers containing styrene have been described; Netherlands application 6,405,455 and Belgian 648,213 (*Chem. Abstr.* 62, 10632 (1965), 63, 10131 (1965), respectively). Likewise, bis(o-bromophenyl)chloromethyl phosphonate and use as a flame retardant is known; U.S. Pat. No. 2,900,405.

British Pat. No. 1, 168, 819 broadly discloses compounds which are utilized as fire retardants in this invention. The compounds disclosed are taught to be insecticides, as acarides, as pest control agents and as bactericidal agents.

SUMMARY OF THE INVENTION

This invention has as main features, the provision of flame retardants, and method of incorporation of compounds in substrates to be made fire resistant.

The compounds have the formula:

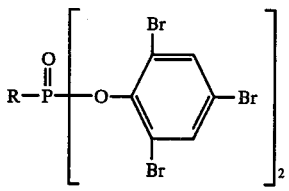

wherein R is a hydrocarbyl radical, preferably alkyl or aryl and having up to about 8 carbon atoms. These compounds can be made by reacting the corresponding $RPOCl_2$ compound and brominated phenol, preferably in the presence of a halogen halide acceptor such as pyridine or other tertiary amine.

A preferred embodiment of this use is the use of the above phosphonates in a polyurethane foam produced by reaction of an organic polyisocyanate and a polymer selected from the class consisting of hydroxylterminated polyethers and hydroxyl-terminated polyesters and having incorporated therein, a flame retardant amount of a phosphonate of formula (I) above. These foams are produced by incorporating the desired amount of one or more compounds in Formula I in the mixture to be foamed.

Likewise, the compounds are useful as fire retardants in polyesters and polycarbonates. They may also be used in polystyrene, polyolefin, and other polymers and resins.

DESCRIPTION OF THE PREFERRED EMBODIMENTS

To prepare compounds of this invention, one reacts the corresponding tribromophenol such as 2, 4, 6-tribromophenol with a phosphonic dihalide. Preferably, the phosphonic dihalide is a phosphonic dichloride. More preferably, the phosphonic dichloride has a hydrocarbyl group bonded to the phosphorus atom. In another preferred embodiment, the hydrocarbyl group has up to 8 carbon atoms; however, it is to be understood that the size of the radical is not critical. Of the preferred phosphonic dichlorides, $RPOCl_2$, the most preferred are alkyl, aryl, alkaryl, and aralkyl phosphonic dichlorides. Typical exemplary materials which can be utilized are $CH_3POCl_2$, $C_2H_5POCl_2$, $C_3H_7POCl_2$, n-$C_8H_{17}POCl_2$, $C_6H_5POCl_2$, $C_6H_5$-$CH_2$-$POCl_2$, $H_3C$-$C_6H_4$-$POCl_2$, and the like.

In conducting the process, one can use a stoichiometric quantity of reactants, but it is not necessary to do so. One can employ an excess of either reactant. In many instances, it is best to use an excess of the tribromophenol in order to assist di-substitution of the phosphonic dichloride. In general, one uses from 2 to 5 or more moles of tribromophenol for every mole of phosphonic dihalide. There is no real upper limit on the excess of either reactant, and in many instances good results are obtained when from about 2 to about 3 moles of bromophenol are utilized per each mole of phosphonic dichloride.

When this process is conducted, a hydrohalide is formed as a by-product. If desired, one can utilize an acceptor for this substance in order to assist reaction. Appropriate acceptors which may be used as tertiary amines, and of these, the picolines and pyridine are preferred. As recognized by a skilled practitioner, it is usually desirable to employ at least enough acceptor to pick up the amount of hydrohalide to be evolved. Greater or lesser amounts can be employed; it being understood that the amount of acceptor, as well as its use, is not critical.

For this process, one prefers to use a liquid reaction medium. If desired, an excess of the hydrohalide acceptor can be employed. Similarly, other organic substances which do not interfere with the course of the reaction can be used. Typical substances are hydrocarbons such as petroleum ether, n-heptane, benzene, and toluene. The amount of liquid reaction medium employed is not critical. In general, one uses from 1 to 10 to 125 or more moles of liquid reaction medium per each mole of tribromophenol employed. It is understood that there is no real upper limit on the amount of liquid reaction medium, this being determined by such secondary characteristics as economics, size of the reaction vessel, and the like.

In conducting the process, one employs a temperature which affords a reasonable rate of reaction and does not cause an untoward amount of undesirable side reactions. The exact reaction temperature employed is not critical. In general, one uses slightly elevated temperatures such as from about 50° to about 250° C. In general, the reaction is conducted under ambient pressures since these are most economical. However, the reaction pressure is not critical. Superatmospheric and subatmospheric pressures can be utilized if desired. In general, vacuum or partial vacuum offers no material advantage. Elevated pressures, say up to 1,000 psig or more can be utilized when it is desired to conduct the process at a temperature above the normal boiling point of one or more materials in the reaction mixture.

It is to be understood that the process described above can be modified by using a metal derivative of the phenol as the starting material. Of these, the alkali metal derivatives, and especially the sodium derivatives, are preferred. These starting materials can be formed, for example, by reacting the phenol with the desired metal hydroxide. This reaction can be conducted in the presence of an aqueous media. In many instances utilization of a metal derivative such as the sodium derivative allows lower temperatures than mentioned above to be employed. Thus, in many instances using sodium derivatives, one can employ a reaction temperature of from ambient to about 60°, 70° or higher. In the main, very slightly elevated temperatures, say from about 25° to about 40° C. can be used when employing a sodium tribromophenolate. Also, when this expedient is used, one normally does not require a tertiary amine or other hydrohalide acceptor as defined above.

The reaction time is not critical, but depends to some extent on the inherent reactivity of the reactants and other reaction conditions employed. In general, reaction times of from about one-half hour to ten days are sufficient.

EXAMPLE I

To a solution of 2, 4, 6-tribromophenol (100 g. 0.30 M) in toluene (600 ml) was added 22.4 g of 50 percent NaOH (11.2 g, 0.28 M). After removing the water by azeotropic distillation, the mixture was cooled and methyl phosphonic dichloride (16.0 g, 0.13 M) made up to 52 mls in toluene was added at 37°–48° in 11 minutes (exotherm). After refluxing 1 hour 20 minutes, the mixture was cooled, washed with water, caustic and again with water, and the organic layer dried over MgSO$_4$ and filtered. After stripping, there was obtained 44 g of a near-white solid (46.8 percent of theoretical product weight). The product is bis(2, 4, 6-tribromophenyl)-methyl phosphonate. Similar results are obtained when 2, 3, 5-tribromophenol and 2, 3, 4-tribromophenol are used in place of 2, 4, 6-tribromophenol, and when KOH is used in place of NaOH.

EXAMPLE II

To a solution of 2, 4, 6-tribromophenol (71.0g, 0.215 M) in toluene (200 ml) and pyridine, (40 g, 0.51 M) is added a solution of methyl phosphonic dichloride (12.0 g, 0.098 M) in toluene (29 g). The addition took 20 minutes at 22.5°–35° (exotherm).

After refluxing at 112° for 2 hours 50 minutes, the mixture was cooled, washed with water, caustic (10%), and then water, and the organic layer dried over CaCl$_2$. After filtering and vacuum stripping, 31 g of bis-(2, 4, 6-tribromophenyl) methyl phosphonate was obtained.

Elemental Analysis — Found: C, 21.9; H, 1.30; Br, 64.3; Cl, 0.0. Calculated: C, 21.6; H, 0.98; Br, 66.5; Cl, 0.0.

Similar results are obtained when 2, 3, 5-tribromophenol and 2, 3, 4-tribromophenol are utilized in the process of the above example.

Similar results are obtained when from 2 to 5 moles of the bromophenol are employed for each mole of methyl phosphonic dichloride. Similar results are obtained when from 1 to 100 moles toluene are used per each mole of phenol and when equivalent volumes of benzene and petroleum ether are substituted for the toluene. Similar results are obtained when the reaction is conducted for from 1 to 10 hours utilizing a temperature of from 50° to 150° C.

Similar results are obtained when the pyridine is replaced with methyl pyridines or trimethyl amine.

Following the procedure of the above example, ethyl phosphonic dichloride reacts with the phenol to yield bis(2, 4, 6-tribromophenol) ethyl phosphonate (I). Likewise, bis(2, 4, 6-tribromophenyl)butyl phosphonate (II), bis(2, 4, 6-tribromophenyl)octyl phosphonate (III), bis(2, 3, 5-tribromophenyl)-benzyl phosphonate (IV), and bis(2, 3, 4-tribromophenyl)-2-ethyl phenyl phosphonate (V) are prepared by reacting the corresponding brominated phenol with the corresponding phosphonic dichloride.

EXAMPLE III

An Erlenmeyer flask was charged with 132.3 g (0.40 mole) of 2, 4, 6-tribromophenol (Aldrich, recrystallized from aqueous ethanol, m.p. 92°–94°), enough ethanol-free chloroform to dilute to 450 ml of solution, 32.2 ml (31.6 g, 0.40 mole) pyridine (dried over KOH) and 28.4 ml (39.1 g, 020 mole) of phenylphosphonic dichloride (Aldrich). The solution was allowed to stand at room temperature for eight days.

The solution was diluted with 1200 ml of ether and extracted with 200 ml of water acidified with a little concentrated HCl. The organic layer was washed twice with water and dried over magnesium sulfate. The dry solution was stripped on a rotary evaporator to leave 140.4 g of product.

The product, bis(2, 4, 6-tribromophenyl)phenylphosphonate, was recrystallized from ethanol. First crop, wt. 70.9 g., m.p. 170°–172°. Second crop, wt. 9.7 g., m.p. 168°–171°. Residue, 55.8 g,. mainly solid plus a little liquid.

EXAMPLE IV

A solution of methyl phosphonic dichloride (36.0 g, 0.293 M) in toluene (50 g) is added to a solution containing 2, 4, 6-tribromophenol (215 g, 0.65 M), dry pyridine (79.1 g, 1.0 M), and toluene (600 ml). The addition requires 30 minutes, using a cold water bath to maintain the temperature at 25°–30°. The mixture is brought to reflux (110°) over 2 hours and maintained at reflux for 3.5 hours.

The reaction mixture is filtered and the pyridine hydrochloride washed with benzene. The combined organic filtrates are shaken with 3% sodium hydroxide solution (two 750 g portions) and then with water (three 1 liter portions). After drying (CaCl$_2$, MgSO$_4$, etc.), the solution is filtered through Celite, stripped to a damp cake, and the residue oven dried to give 163 g (77%) of bis(2, 4, 6-tribromophenyl)methyl phosphonate. If additional purity is desired, the product may be recrystallized in benzene or benzene-hexane to give white phosphonate of m.p. 162°–168.5° C.

Polyurethane foams are formed from compositions comprising
 (i) a polymer containing free hydroxy groups such as hydroxylterminated polyesters or hydroxy-terminated polyethers,
 (ii) a polyisocyanate, and
 (iii) a foaming agent.
usually, other materials are added to the composition to be foamed such as
 (iv) catalysts,
 (v) plasticizers, and
 (vi) emulsifiers,
for example.

The polyesters may be derived from a reaction product of a dicarboxylic acid such as adipic acid, and a dihydric alcohol such as ethylene glycol, and may be modified by a material such as trimethylolpropane;

confer pages 20-21 of Ferrigno, *Rigid Plastic Foams*, Reinhold Publishing Corp., New York, N. Y. (1963).

The polyethers are ethylene oxide and propylene oxide adducts of polyhydric alcohols and are described on pages 10-19 of Ferrigno, supra.

Polyisocyanates which can be used are described in U.S. Pat. No. 3,574,149; confer the paragraph bridging columns 3 and 4. Another description of exemplary isocyanates is in U.S. Pat. No. 3,338,846 in the first two paragraphs of column 8.

Foaming agents such as water and urethanes derived from tertiary alcohols are known; confer U.S. Pat. No. 3,338,846. Fluorocarbon blowing agents are described in U.S. Pat. No. 3,574,149.

For the other ingredients which can be added to make rigid or flexible polyurethane foams, reference is also made to U.S. Pat. No. 3,338,845, 3,338,846, and 3,574,149, all cited above, and incorporated by reference herein as if fully set forth.

For this invention, a fire retardant amount of a phosphonate provided herein, or mixture thereof is incorporated in the formulations. In general, from about 2 to about 40 parts by weight per each 100 parts by weight polyol, and more preferably, from 5 to 25 parts per 100 parts by weight polyol are used, it being understood that greater or lesser quantities can be used as desired.

The exact nature of the polyurethane foam or the ingredients admixed to prepare the foam are not critical, since the fire retardancy of the additives is not unduly restricted by the foams or the ingredients from which they are made.

EXAMPLE V

To each of five separate batches of 100 grams of polyoxypropylene polyol (Pluracol GP-3030) having an average molecular weight of 2920 and a hydroxyl number of 56, were added 1.0 gram silicone surfactant (Dow Corning 192), 0.3 gram tertiary amine blowing catalyst (DABCO 33-L), and 4.0 grams distilled water. To two of the above dispersions were added 10.0 grams and 15.0 grams bis(2, 4, 6-tribromophenyl)methylphosphonate. To two other dispersions were added 10.0 grams and 15.0 grams bis(2, 4, 6-tribromophenyl)phenylphosphonate. No flame retardants were added to the fifth dispersion.

Each of the above dispersions were mixed thoroughly for 10 seconds. Next, 0.2 gram of stannous octoate catalyst was added and mixed for 5 seconds. Next, 50.0 grams of an 80:20 blend of the 2, 4- and 2, 6-isomers of toluene diisocyanate were added and stirred rapidly for 10 seconds or until creaming was noted. The resulting admixtures were poured into 8 inch × 8 inch × 4 inch boxes and allowed 3-5 minutes for the foaming reaction to take place. Then the foams were placed in an oven and cured for 30 minutes at about 120° C.

The foams were then removed from the oven, aged for seven days at ambient temperature, and cut into test specimens for flammability testing in accordance with ASTM-D-1692-59T.

The foam recipes and test results are shown below.

| Materials | Foam A | Foam B | Foam C | Foam D | Foam E |
|---|---|---|---|---|---|
| Polyol GP-3030 | 100 | 100 | 100 | 100 | 100 |
| Surfactant 192 | 1 | 1 | 1 | 1 | 1 |
| DABCO 33-L | 0.3 | 0.3 | 0.3 | 0.3 | 0.3 |
| Stannous octoate | 0.2 | 0.2 | 0.2 | 0.2 | 0.2 |
| Distilled water | 4 | 4 | 4 | 4 | 4 |
| Toluene diisocyanate, | 50 | 50 | 50 | 50 | 50 |

| -continued | | | | | |
|---|---|---|---|---|---|
| Materials | Foam A | Foam B | Foam C | Foam D | Foam E |
| 80:20 Bis(tribromophenyl)-methyl-phosphonate | — | 10 | 15 | — | — |
| Bis(tribromophenyl)-phenyl phosphonate | — | — | — | 10 | 15 |
| Foam density, pcf | 1.61 | 1.90 | 1.85 | 1.85 | 1.9 |

| | ASTM D-1692-59T Results | | | | |
|---|---|---|---|---|---|
| Foam | Foam A | Foam B | Foam C | Foam D | Foam E |
| Self extinguishing time, Seconds | — | 44 | — | — | — |
| Distance Burned, Inches | 5.0 | 2.5 | 5.0 | 5.0 | 5.0 |
| Rate of Burning, Inches per minute | 7.0 | 3.4 | 3.0 | 4.6 | 4.1 |

In the tables above, the amounts of materials given are in grams.

Similar results are obtained when from 2 to 40 parts per hundred of compounds I - V above are substituted for the phosphonates shown in the above examples.

As stated above, the compounds of this invention are useful as flame retardants when added to polymers such as rigid or linear polyester, polystyrene, polyurethanes, polycarbonates, polyolefins, and the like.

Linear polyesters of this invention can be prepared using conventional polymerization procedures. Reaction conditions and catalysts employed can be selected from those described in the art. Thus, typical fiber-forming polyesters of this invention can be made according to the techniques described in the *Encyclopedia of Polymer Science and Technology*, Interscience Publishers, New York, New York (1969), Volume 11, pages 1-41.

Thus, the brominated diols may be employed as reactive intermediates in the preparation of polyesters obtained from the reaction of glycols of the general formula

$$HO\text{---}(CH_2)_x\text{---}OH$$

wherein x is an integer from about 2 to 10. Such glycols include ethylene glycol, which is preferred glycol, 1, 3-propanediol, 1, 5-pentanediol, 1, 6-hexanediol, 1, 7-heptanediol, 1, 8-octanediol, 1, 9-nonanediol, 1, 10-decanediol, 2, 2-dimethyl-1, 3-propanediol, 2, 2-bis(-bromomethyl)-1, 3-propanediol, or the like. These glycols, and particularly the preferred glycols, ethylene glycol and 1, 4-cyclohexane dimethanol, are reacted with dicarboxylic acids or suitable esters thereof, preferably terephthalic acid or dimethyl terephthalate, or other dibasic acids including 2, 5-dibromoterephthalic acid, isophthalic acid, diphenyl-4, 4'-dicarboxylic acid, naphthalene-2, 5-dicarboxylic acid, adipic acid, sebacic acid, succinic acid, oxalic acid, glutaric acid, pimelic acid, suberic azelaic acid, and the like. In addition to being useful with polyesters derived from the more common diols and dicarboxylic acids, the polyester can be made with other reactants including glycerol, sorbitol, pentaerythritol, methoxypolyethylene glycol, neopentyl glycol, monohydroxypivalate, trimethylopropane, trimesic acid, p, p'-dicarboxydiphenylmethane, p, p'-dicarboxydiphenoxyethane, p-carboxyphenoxyacetic acid and the like.

As appreciated in the art, the dibasic acids mentioned above such as adipic acid, azelaic acid or dimer acids are generally used to improve the dyeability of the polyester. Sulfonated isophthalic acid may also be employed for this purpose. In general, the amounts of these reactants should not exceed about 3 mole percent of the polyester.

The linear polyesters of this invention are preferably made from either ethylene glycol or 1, 4-cyclohexanedimethanol as the glycol. Preferably, they are reacted with terephthalic acid and dimethyl terephthalate; the latter being utilized in a well-known type of ester interchange reaction.

As appreciated in the art, the molecular weight of the polyester must be sufficient to form a suitable fiber if that is the intended purpose of the polyester. Thus, it is preferred to prepare polyesters of the type described above having a number average molecular weight in the range of about 10,000 to about 50,000.

Polyesters obtained by the present invention may be treated in accordance with conventional techiques for modification and further treatment of the polyester fibers. Thus, the copolymers of this invention can be compounded with known stabilizers, lubricants, plasticizers, dyes, antistatic agents, and the like. The blending may be conducted by conventional techniques such as by incorporating the adjuvants or additive materials in the mixture to be polymerized or by blending, typically melt blending, after the polymer is made.

Fibers and filaments of the present invention are prepared by conventional procedures such as melt extrusion and by spinning from solution. Cold drawing can be utilized to orient the fibers. Such fibers may be used to prepare monofilaments, yarns, tows, or cords. These may be readily knitted or woven. They can be used in textile applications alone or can be blended with other materials such as cotton, rayon, or other polyester. Of the blended fabrics, cotton-polyester blends are preferred. As is well known, polyester fibers are useful in clothing, draperies, and carpeting. The polyesters of this invention can be used in those applications.

The fire retardant properties of the polyesters of this invention can be measured by conventional procedures such as the Limited Oxygen Index or by a vertical flame test. Usually, the amount of fire retardance is proportional to the amount of fire retardant of this invention. In general, best flame retardancy is achieved when the bromine content of the polyester is at least about 7 weight percent. The content of the above compounds generally is from about 3 to about 20 weight percent, more preferably, from about 6 to about 15 weight percent.

A larger group of polyesters is the unsaturated resins. These are used for reinforced shapes and coatings. For these resins, unsaturated acids or alcohols are incorporated in the polymer. By "unsaturated" is meant the presence of an active carbon-to-carbon double bond. Through this unsaturated bond, crosslinking is achieved. For example, if some of the phthalic acid in the polymer above is replaced by maleic acid, then crosslinking can be achieved using divinylbenzene or styrene. To achieve this crosslinking, a curing agent is mixed with the polymerizable mixture; typically, the curing agent is an organic peroxide.

Unsaturated polyesters of this type are called alkyd resins in the paint industry. They have many advantageous properties such as strength, weather resistance, pigmentability, etc.

As is well known, unsaturated polyester resins are based on prepolymers which are made by the esterification of dihydric alcohols with unsaturated and modifying dibasic acids and/or anhydrides. The unsaturated polymer is mixed with an unsaturated monomer, e.g., styrene, with which it crosslinks. A catalyst, polymerization inhibitor and inert filler are among the typical additives.

The flame retardants of this invention can be used in unsaturated polyesters in the same concentrations as described above for the linear polyesters. Likewise, the rigid polyesters can be made from the same glycols and disbasic acids above-mentioned.

Flame retardant compounds of the present invention may be incorporated into the $\alpha$-olefin polymers, for example, homo and copolymers containing as the major constituent ethylene, propylene, butylene, isobutylene, and similar monomer units. Copolymers of the foregoing with the vinyl-type monomers, such as vinyl halides, vinylidene halides, vinyl acetates, vinyl butyrals, butadiene copolymers, acrylonitrilebutadiene-styrene polymers, acrylonitriles, the acrylate and methacrylate polymers, for example, acrylic acid, methacrylic acid, methacrylate, ethyl acrylate, propyl acrylate, butyl acrylates, amyl acrylates, hexyl acrylates and their corresponding methacrylates, as well as monomers such as trichloroethylene, dimethyl maleate, vinyl butyl ether, butadiene, vinyl alcohol, maleic anhydride, carbon monoxide, ethyl acetate, and the like.

Polypropylene is an exemplary illustration of preferred $\alpha$-olefin polymers rendered fire retardant by compounds of this invention.

In general, the polypropylene compositions according to this invention can be prepared according to methods known in the art; see KirkOthmer, *Encyclopedia of Chemical Technology*, Vol. 14, Second Edition, pages 282–309. Thus, the polymers of polypropylene according to this invention polypropylene compositions suitable for sheet film and filament, fiber, foam, rod, elastomeric polymers and the like are contemplated. Such polymers are suitable for injection molding, blow molding, compression molding, thermoforming or vacuum forming, wire and cable covering and coating applications. Of course, the polypropylene compositions can also contain various known plasticizers, stabilizers, chain, terminators, color improvers, delustrants, diluents, reinforcing materials, and the like.

For the $\alpha$-olefinic polymers, the concentration of the fire retardant compound of this invention is from about 5 to about 30, more preferably from about 10 to 20 weight percent.

The flame retardants of this invention can be incorporated in polystyrene and other polymers made from $\alpha$-olefinic aromatic monomers. Preferably, the flame retardants are used with polymers whose flammability is to be reduced below any degree of flame retardancy inherent in the polymer. Accordingly, the flame retardants are ordinarily more useful with polymers that do not contain halogens, or other groups that can confer flame retardancy. On the other hand, the flame retardants can be used with halogenated polymers or other polymers having inherent flame resistance when it is desirable to further reduce their flammability.

Preferably the flame retardants are used with solid polymers; such as those derived from monomers having up to about 12 carbon atoms and the formula

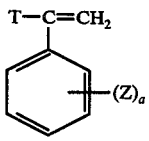

wherein T is hydrogen, $C_1$-$C_4$ alkyl, chlorine or bromine, Z is halogen, $C_1$-$C_4$ alkyl, or vinyl, and $a$ is a 0 or a small whole number of from 1 to 5. Preferably, the monomer has up to about 10 carbon atoms and the formula

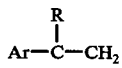

wherein Ar is a benzene nucleus and R is H or methyl. Preferably, the benzene nucleus is derived from benzene or toluene although more highly substituted nuclei can be present. The nucleus may be halogenated with chlorine, bromine or both. Typical monomers are styrene, α-methylstyrene, ortho-, meta-, and paravinyltoluene, ortho-, meta-, and parachlorostyrene, and ortho-, meta-, and parabromostyrene, divinylbenzene, and the like.

Illustrative polymers are the homopolymers of these monomers such as homopolymers of styrene, chlorostyrene, α-methylstyrene, etc. Copolymers of α-olefinic aromatics such as styrene-α-methylstyrene copolymer, styrene-α-bromostyrene copolymer and copolymers such as styrene-acrylonitrile copolymers, styrene-methyl methacrylate copolymers, etc.

In a preferred embodiment, solid polymers made from such monomers and having a weight average molecular weight of from about 50,000 to about 1,000,000 are used with the flame retardants of this invention. The molecular weight can be determined by a viscosity technique such as that described for polystyrene on pages 212–213 of Volume 13, *Encyclopedia of Polymer Science and Technology*, Interscience Publishers, a division of John Wiley and Sons (1970).

The flame retardant is added in an effective amount, usually from about 0.1 to about 35 weight percent based on the weight of polymer. Amounts from about 5 – 30 weight percent are preferred, from about 10 to about 25 weight percent are more preferred.

The flame retardant can be used in conjunction with other known additives if desired. In the prior art, antimony oxide is commonly employed with decabromobiphenyl ether when it is used to fire retard polystyrene; U.S. Pat. No. 3,075,944.

By way of example, a high impact polystyrene (such as Styron 475 U-27 from Dow Chemical Company) can be utilized as the substrate to be flame retardant. A sample of that material had an LOI when tested.

Blending with a compound of this invention such as bis(2,4,6-tribromophenyl)methyl phosphonate in amount such that 10 or 20 weight percent of such compound is incorporated will give rise to an increase of LOI value showing fire retardancy is conferred by the compound.

Optionally, the compound can be used with $Sb_2O_3$ say, for example 5 or 10 weight percent based on the amount of polymer.

I claim:

1. A fire retardant organic polymer or resin having incorporated therein a small but fire retardant effective amount of bis(2,4,6-tribromophenyl) methylphosphonate.

2. A composition of claim 1 wherein the organic polymer is polystyrene.

3. A polyurethane foam having incorporated therein a flame retardant amount of a phosphonate having the formula

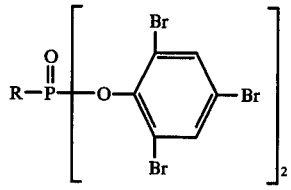

wherein R is a hydrocarbyl radical of up to about 8 carbon atoms.

4. A foam of claim 3 wherein R is methyl.
5. A foam of claim 3 wherein R is phenyl.

* * * * *